United States Patent [19]
Reimers

[11] 3,834,517
[45] Sept. 10, 1974

[54] HIGH SPEED CONTAINER ORIENTING MECHANISM

[75] Inventor: James L. Reimers, Saratoga, Calif.

[73] Assignee: FMC Corporation, San Jose, Calif.

[22] Filed: Jan. 22, 1973

[21] Appl. No.: 325,680

[52] U.S. Cl.............. 198/33 AC, 198/102, 198/182
[51] Int. Cl............................................ B65g 47/24
[58] Field of Search......... 198/181, 182, 43, 33 AA, 198/102; 94/17; 99/362

[56] References Cited
UNITED STATES PATENTS
| | | | |
|---|---|---|---|
| 2,150,320 | 3/1939 | Edwards | 198/182 |
| 3,189,165 | 6/1965 | Theijsmeijer | 198/182 |

FOREIGN PATENTS OR APPLICATIONS
| | | | |
|---|---|---|---|
| 1,293,683 | 4/1969 | Germany | 198/43 |

Primary Examiner—Richard E. Aegerter
Attorney, Agent, or Firm—C. E. Tripp

[57] ABSTRACT

An orienting mechanism including an inclined endless belt having inlet and outlet paths substantially 180 degrees apart for reorienting cylindrical containers of steel, glass, aluminum, etc., delivered in end to end abutting relation, for discharge in single file upright position, at relatively high rates; the containers do not impact one another, or any fixed structure. This preserves seal integrity and assures that the sterile environment of the product is maintained.

3 Claims, 7 Drawing Figures

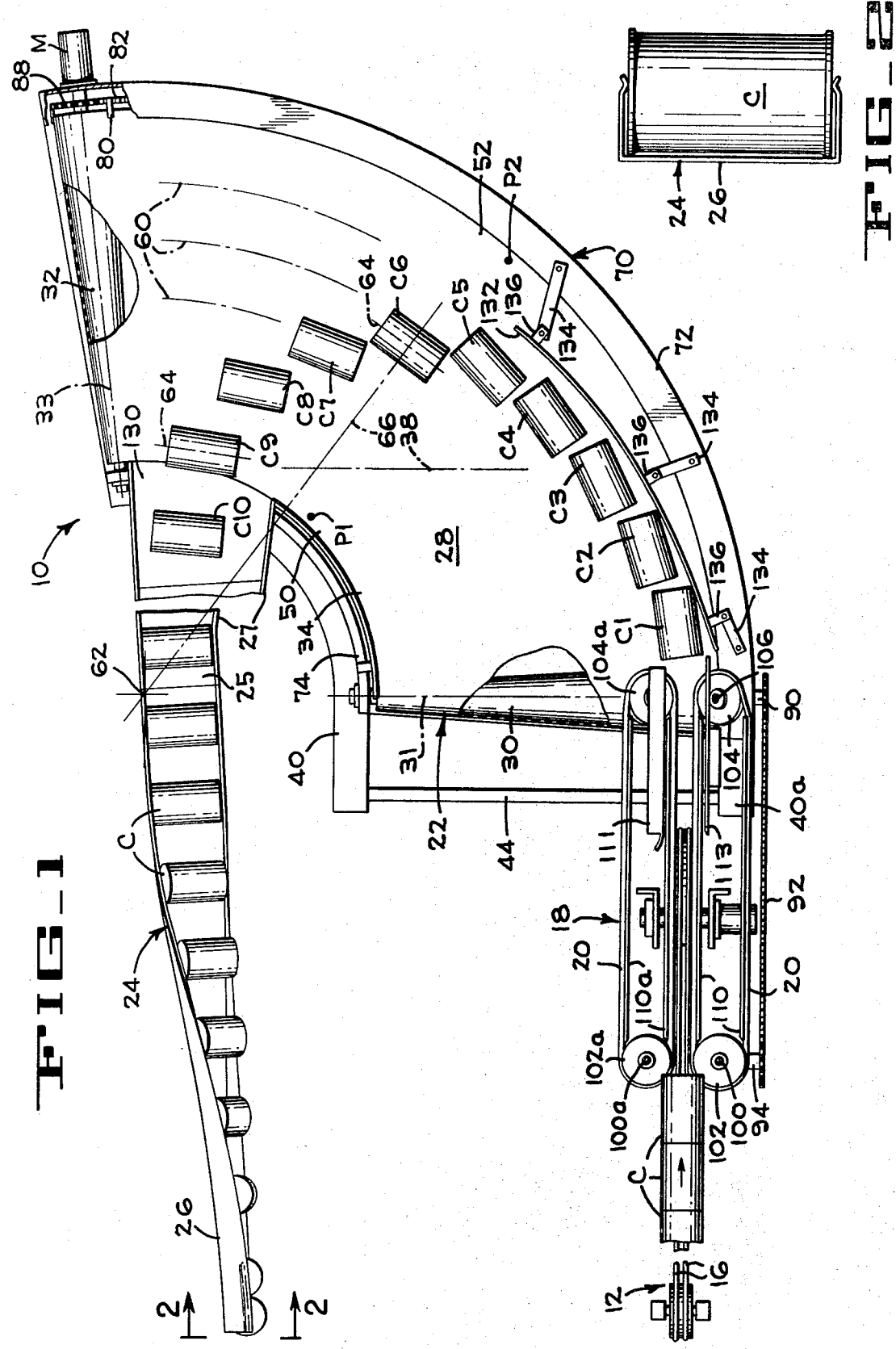

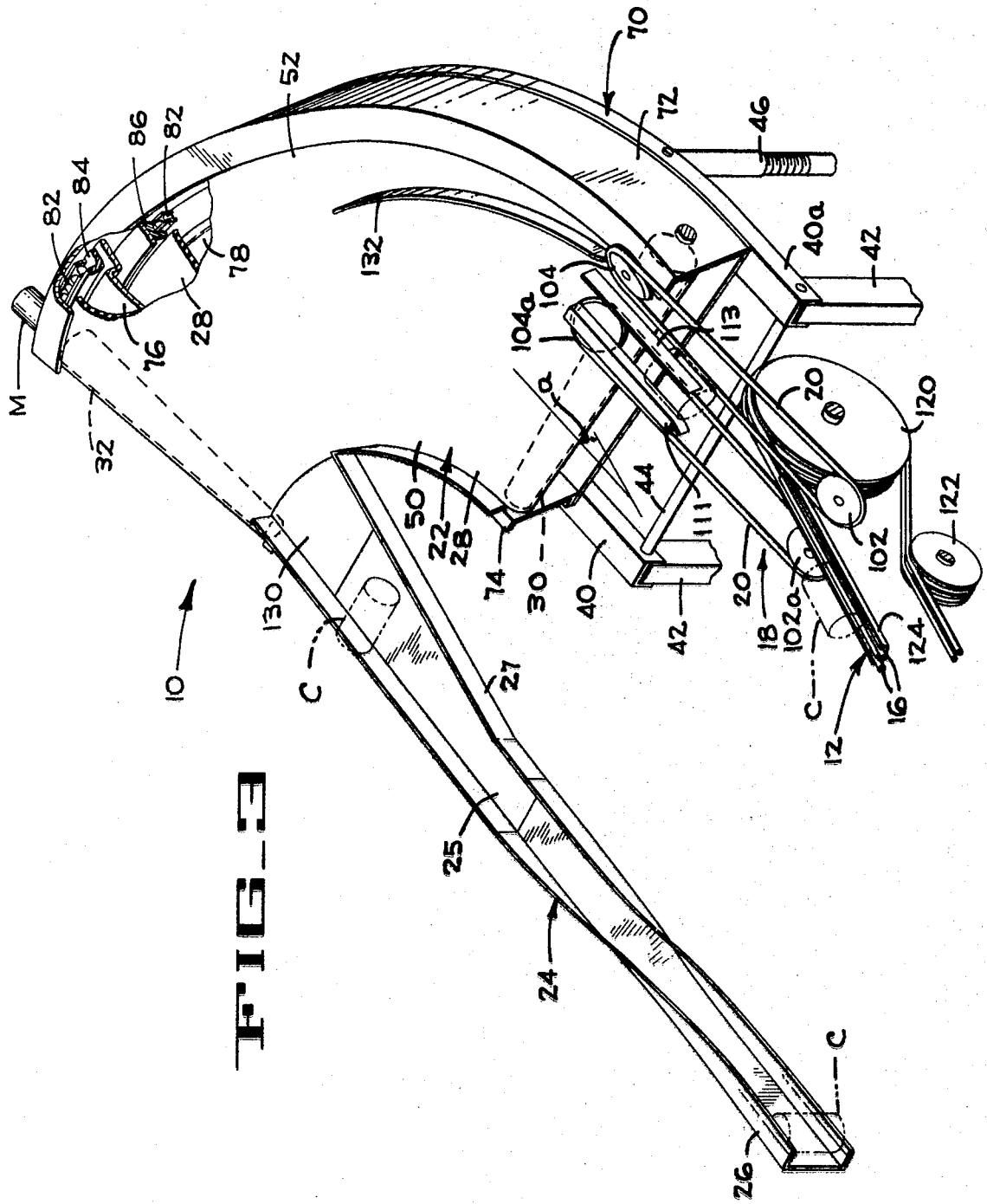

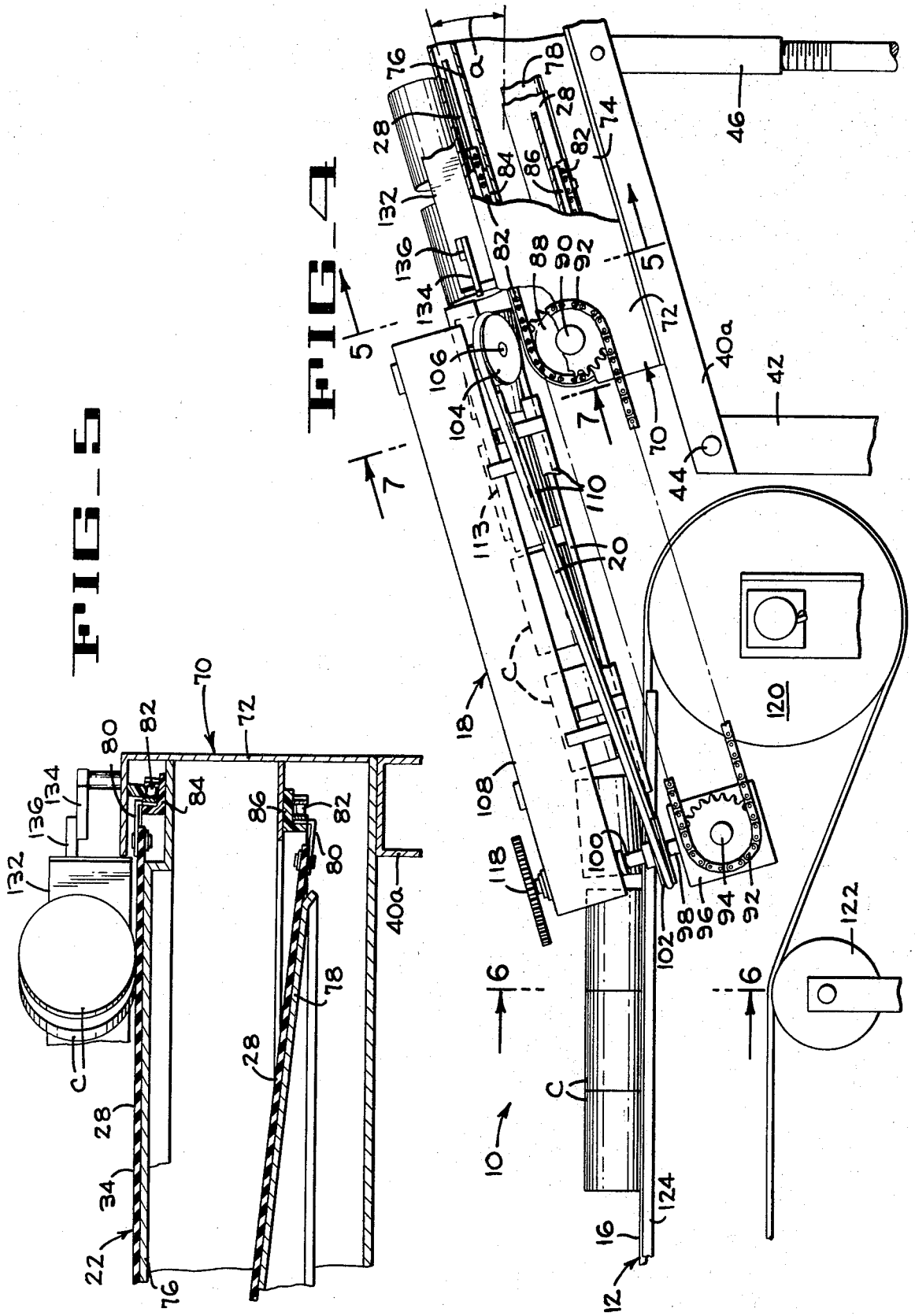

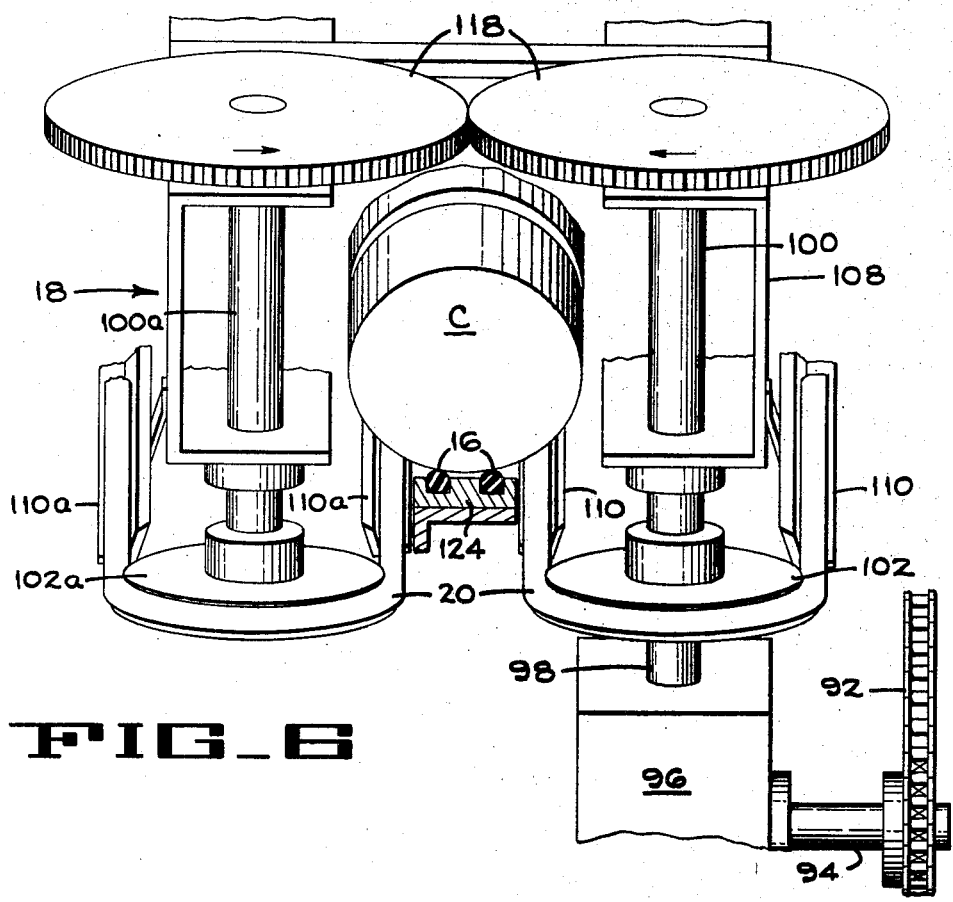
FIG_6
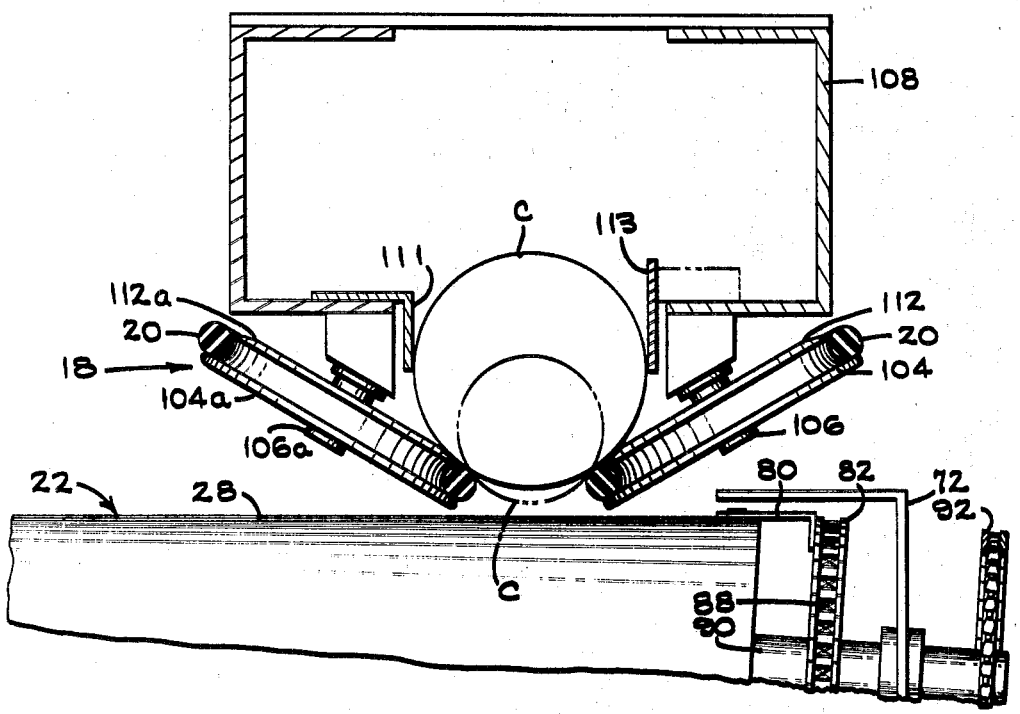
FIG_7

HIGH SPEED CONTAINER ORIENTING MECHANISM

BACKGROUND OF THE INVENTION

1. Field of the Invention

The present invention concerns a container orienting mechanism for reorienting cylindrical containers from single file endwise orientation to single file upright orientation.

2. Description of the Prior Art

Some types of pressure sterilizers for the continuous sterilization of food products in cylindrical containers discharge the containers in groups wherein they are in axial alignment forming what are commonly referred to as "sticks". An example of stick discharge is shown in the Mencacci U.S. Pat. No. 3,340,791. If the containers are to be then run through a labeling machine, for example, they must first be separated and erected to upright positions. Other downstream equipment besides a labeling machine, such as some types of can dryers, palletizers or casers, require that the containers be made upright. One way of accomplishing this, as disclosed in the Mencacci patent supra, is to guide the containers downward through a twisted chute. However, twisted chute container turning devices are restricted to a very narrow range of different size containers, and it is a feature of most present day continuous sterilizers which have stick discharge that the containers are processed in sticks which are not narrowly limited as to container length and diameter. Thus, the container conveying means for carrying the sticks through the sterilizer has trough-like conveying flights of fixed length, and a given number of axially aligned containers can be accommodated in that length. The transverse dimension of a trough may accommodate a wide range of different diameter containers. Therefore, a conveying flight in one production run may have a large number of short containers in any given diameter within the range of diameters, and in another production run may comprise a smaller number of longer containers, usually of larger diameter. The result of this requirement for accommodating a large range of can lengths and diameters is that all size-combinations cannot be handled by one size of twisted discharge chute, and this necessitates change parts, the labor for installing the parts, and unproductive down-time when the sterilizer is inoperative. A further disadvantage of twisted gravity chutes is that they can restrict the output because a steep chute will increase the handling impacts on the containers. In other words, to keep container impacts low enough to assure safe handling, their rate of discharge may be unacceptably low.

It has previously been proposed to employ the combined forces of mechanical acceleration and gravity to reorient cylindrical containers. The U.S. Pat. No. to Van Der Winden 3,197,013 discloses a container orienting mechanism including those operating principles, plus magnetic attraction. In the most pertinent apparatus embodiment in this patent, a single file of containers moving endwise is delivered onto a transversely inclined drive belt moving in the same direction so that the belt increases the interspacing of the containers while gravity causes the containers to roll toward the lower edge of the belt. At the point where the containers leave the belt, they are guided under a driven roller and into a chute that is perpendicular to the initial path of movement of the containers. The chute is twisted to erect the containers to upright positions upon discharge. For certain applications of the patented apparatus, there are disadvantages, one being the container size restriction imposed by the twisted discharge chute. Another disadvantage is that the endwise velocity of the incoming containers is uniform and relatively high. This can result in end seal damage if the containers accidentally impact one another, or any fixed structure adjacent their path of travel. Impacts can result in virtually undetectable seam leakage which may cause dangerous bacterial growths.

In the patented apparatus, it is necessary to use a magnetic device under the container supporting flight of the belt because when a container is projected from lateral guide members onto the belt, the leading end of the container tends to roll down the belt while the trailing end is held by the guide members. The magnetic attraction holds up the leading end to maintain the alignment of the container while it clears the guide members. Thus, a further disadvantage of the patented device is that it will not operate with aluminum, glass or metal-end paper containers, or with any other type of container which is not substantially entirely formed of ferrous metal.

From the preceding outline of the general problem and the prior art, it is evident that a commercially desirable container orienting system would be universally applicable to all types of cylindrical containers, and would prevent damaging impacts to the containers at high handling rates. The present invention provides such a system in the form of a specially inclined arcuate path belt conveyor. Arcuate or 90° path conveyor belts having a horizontal upper surface for carrying luggage on a round go round have been employed in airports. Such a belt appears in U.S. Pat. No. 3,044,603, July 17, 1962.

SUMMARY OF THE INVENTION

The present invention is based upon the fact that a specialized form of arcuate path conveyor, namely, a turning belt which is used to convey articles (such as luggage) "around corners", or from one horizontal conveying path to another horizontal conveying path angularly offset from the first, can be modified and effectively utilized to reorient any types of cylindrical containers from endwise abutting relation, to upstanding positions, at unusually high production rates with virtually no danger of seal damage, denting, breakage or other adverse results.

A turning belt is in the form of a segment of a flat or shallow cone, mounted on tapered rollers so that the inlet or receiving end of the conveying surface is horizontal and perpendicular to the delivery conveyor. The other or outlet end of the conveyor has its roller oriented about 90° to the inlet roller. The conveying surface, as viewed in plan, has concentric short and long arcuate edges, and the axes of the tapered inlet and outlet rollers which support the belt intersect at the center point of the arcuate inner and outer edges of the belt. Since the inner and outer edges of the belt follow concentric circular arcs, it is evident that the linear speed of the belt along various arcuate paths on the belt decreases from the inner to the outer edge of the belt. Thus, an article delivered onto the outer edge portion of the belt will travel faster in the direction of belt motion than an article which is closer to the inner edge portion of the belt, and hence an article which is moved, in transit, from the outer edge portion to the inner edge portion will decelerate in the direction of belt motion. These conditions are simply and positively taken advantage of, in the present invention to reorient a row of cylindrical containers from an aligned axis position to a parallel axis position. The result accrues from slightly tilting the conveying plane of the arcuate turning belt, and feeding cylindrical containers in endwise abutting relation onto an outer edge portion of the belt. As the containers advance, they follow an upwardly inclined arcuate path, and since the axes of the containers are gradually changed in orientation, gravity causes them to roll downward across the belt while moving around with the belt. This trajectory, resulting from both endwise and rolling movement of the containers moves the containers across and along the conveying surface with curvilinear, non-circular or spiral motion so that they decelerate in the direction of their axes, and ultimately roll about their axes in spaced apart relation off the inner edge (lowest velocity portion) of the belt into a twisted discharge chute. The discharge chute erects the containers to upright position, single file, for subsequent feeding to a labeling machine or other processing machine requiring the containers to be thus oriented. A feature of the orienting apparatus is that it is operable with containers of any length or diameter smaller than the maximum size container for which it is designed.

In accordance with the principles outlined in the foregoing summary, the following features are achieved:

1. The turning belt reorients containers without auxiliary apparatus, except fixed guide and support members, and has minimal container contact.

2. With adjustable container guides, and other simple expedients, the orienting apparatus can handle a range of different container sizes, even without speed adjustment of the turning belt.

3. The containers are gently decelerated, without contacting one another, during the reorientation.

4. The apparatus is capable of orienting glass, aluminum, paper and other cylindrical containers that are easily damaged or broken.

5. The foregoing functions and features are effected at high delivery rates, with continuous motion, and with substantially no container contact other than supporting contact.

BRIEF DESCRIPTION OF THE DRAWINGS

FIG. 1 is a diagrammatic plan of the container orienting mechanism of the present invention.

FIG. 2 is an enlarged elevation viewed in the direction of the arrows 2—2 on FIG. 1.

FIG. 3 is a diagrammatic isometric view of the major portion of the FIG. 1 apparatus.

FIG. 4 is a diagrammatic side elevation, at an enlarged scale, of a portion of the apparatus shown in FIG. 1.

FIG. 5 is an enlarged section taken along lines 5—5 on FIG. 4.

FIGS. 6 and 7 are enlarged sections taken along lines 6—6 and 7—7, respectively, on FIG. 4.

DESCRIPTION OF THE PREFERRED EMBODIMENT

In brief outline, and with reference to FIG. 1, the container orienting mechanism 10 is shown in association with a discharge conveyor 12 leading from a container processing machine, such as a continuous sterilizer, not shown, that deposits a series of endwise abutting containers C (a "stick" of containers) on the discharge conveyor. The discharge conveyor shown includes two parallel driven belts 16 which support the containers C and advance them, still in endwise abutting relation, to a delivery conveyor 18 for the orienting mechanism. The delivery conveyor 18 is provided with a pair of delivery belts 20 that straddle the belts 16 and are driven faster than belts 16 to cause the containers to be interspaced before the delivery conveyor deposits the containers one by one onto a turning belt conveyor 22 of the container orienting mechanism 10. The containers are discharged from the turning belt conveyor 22 in rolling position into a chute 24 having a receiving portion 25 that is disposed to receive horizontal axis containers, and a twisted end portion 26 that erects the rolling containers to upright position. An inclined inner guide wall 27 (FIG. 3) leads into the horizontal container portion 25. The structural combination of the delivery conveyor 18, the specially inclined turning belt conveyor 22, and the chute 24 are principle features of the present invention.

Except for its geometrical arrangement, the turning belt conveyor 22 (hereinafter turning belt) resemblies a commercially available unit such as that disclosed in detail in the aforesaid U.S. Pat. No. 3,044,603. The turning belt includes an endless belt having a substantially flat conveying surface movable in a curved path to change the direction of movement of articles carried by the conveying surface. In the present instance, the turning belt conveyor 22 is provided with an endless belt 28 that is mounted on tapered rollers 30 and 32, and includes a conveying surface 34 inclined upward from the container receiving roller 30 and the zone at which the containers C are deposited on the conveying surfaces 34. This upward inclination is in the direction of container delivery to the belt 28, and is indicated by the angle "$a$" in FIG. 4. In the embodiment shown, the angle $a$ is about 17 degrees. Despite this upward inclination in one direction, a reference line 38 (FIG. 1), on the planar conveying surface that is normal to the delivery path of the containers, is substantially horizontal, but it is not absolutely necessary that the conveying surface be inclined in only one direction.

In order to provide for angular adjustment of the inclination angle $a$ of the belt 28, the belt is mounted as a unit on arcuate sub-frame channels 40, 40$a$ (FIGS. 3 and 4). Floor supported standards 42 (FIGS. 3 and 4) mount a horizontal pivot shaft 44 which extends through and pivotally mounts the arcuate sub-frame channels 40, 40$a$. A plurality of telescopic legs 46 are pivotally connected to the outer sub-frame channel 40$a$ for adjusting the inclination angle $a$ of the turning belt.

A characteristic of the turning belt, due to the configuration of its conveying surface, is that the velocity at a point P1 (FIG. 1) near the inner edge 50 of the belt 28 is slower than at a point P2 near the outer edge 52. Accordingly, points located on the conveying surface 34, along concentric arcuate paths 60, move progressively more slowly as their paths approach the inner edge 50. This characteristic is advantageously used to decelerate the containers C in the direction of their axes, as they are transported on the conveying surface 34.

Another characteristic of the turning belt conveyor is that the rotational axes 31 and 33 of the tapered support rollers 30 and 32 intersect at a point 62 (FIG. 1) which is the center of the concentric inner and outer edges 50 and 52, respectively, of the conveying surface 34. Since there are no forces generated which will cause the containers C to twist about axis normal to their rolling axes 64, as the containers are advanced by the conveying surface 34 beyond the axis 31 of the inlet-roller 32, the rolling axes 64 of the containers remain substantially normal to radial lines generated from the point 62, such as the line 66 shown in FIG. 1. Stated otherwise, each container C is constantly in a position to roll by gravity toward the point 62 as it traverses the inclined conveying surface 34, and will therefore move in a curvilinear path with continuous deceleration in the direction of the container axes 64, coupled with increasing acceleration (rolling motion) about those axes.

As a consequence of the gravitational and mechanical forces just described, any one container C will assume the sequential positions illustrated for the series of containers (C1 – C-9) shown in FIG. 1, and although the containers are axially decelerating, they will roll off the inner edge 50 of the conveying surface 34 into the discharge chute 24, thus having been gently reoriented from an initial endwise (axial) movement to a laterally rolling movement. The rolling containers are first guided into the flat chute portion 25 and then traverse the twisted portion 26 of the chute and are thereby erected to upright positions for continued movement in their upright positions by any suitable means to other processing machinery requiring that orientation.

Before continuing with a detailed description of the structure, it should be noted that the operating principles of the orienting mechanism 10 uniquely adapts the machine to handle any size or weight of container without changing the belt velocity or the angularity of the turning belt conveyor 22. Since the terminal velocities due to gravitational acceleration are the same for all sizes of containers, disregarding the negligible difference in rolling friction and air friction, there is no adjustment necessary for container size, once the turning belt speed and angularity has been established for a given output rate. In the embodiment herein disclosed, the only limitation to container size concerns the diameter, and is determined by the spacing between the belt flights 20 (FIG. 7) of the input conveyor 18, but the spacing of the belt flights could, with only ordinary skill, be made adjustable to handle an even larger range of container diameters.

With more specific reference now to structural details which have been found useful in an actual structure embodiment of the present invention, the turning belt 28 (FIG. 3) conventionally includes a fabricated, supported frame 70 having an outer arcuate channel 72 on the pivotally mounted channel 40a and an inner arcuate channel 74 on the pivotally mounted channel 40. The channels 72 and 74 are interconnected by an upper slider plate 76 for supporting the upper run of the endless conveyor belt 28. FIG. 5 shows the slider plate 76 attached to the channel 76. The lower or return run of the belt 28 is supported by a lower slider plate 78 which is connected to the inner channel 74 and stops short of the outer channel 72. These details are not critical to the invention and are shown in the aforesaid U.S. Pat. No. 3,100,565. The belt 28, before installation, is in the form of a double walled truncated cone, and is flattened when installed on the tapered rollers 30 and 32. In order to prevent the belt from sliding toward the small ends of the rollers, the outer edge 52 of the belt 28 is secured by a plurality of spaced brackets 80 (FIG. 5) to an endless roller chain 82 which follows the paths of curved guide bars 84 and 86. A sprocket 88 (FIGS. 1 and 4) on the large end of each tapered roller is engaged by the chain. The terminal roller 32 and the associated sprocket 88 are driven by a hydraulic motor M (FIG. 1) or by any other suitable power source having the capability of speed adjustment.

The container receiving tapered roller 30 is thus driven by the chain 82 and the belt 28 when the motor M is energized. This provides convenient power for the delivery belts 20 by means of a shaft 90 (FIG. 3) which supports the tapered roller 30. A chain and sprocket drive connection 92 on the shaft 90 powers the input shaft 94 of a gearbox 96 (FIG. 4). The output shaft 98 of the gearbox is connected to a driveshaft 100 which carries a drive pulley 102 for one of the delivery belts 20. At its opposite end portion, that delivery belt 20 is trained around an idler pulley 104 on an inclined idler shaft 106. Both the drive and idler shafts 100, 106 depend from a fixed, open frame 108, with the inner reach of the delivery belt 20, as shown in FIG. 4, parallel to the conveying surface 34 of the conveyor belt 28. Frame 108 is support by means, not shown, secured to the sub-frame channels 40, 40a so that tilting adjustment of the sub-frame does not alter the relation of the delivery conveyor 18 and the turning belt 22.

In order to allow the inner reach of the delivery belt to lie close to the conveying surface, the idler pulley 104 and its shaft 106 are canted, as also shown in FIG. 7. Tracks 110 (FIG. 6) support the major portion of the reaches of the delivery belts. The other half of the delivery conveyor 18 has similar parts to those described, and those parts are identified with the same reference numerals plus the suffix a.

As shown in FIGS. 1, 3 and 7, the discharge end of the delivery conveyor 18 is provided with container guides 111 and 113 which prevent the containers from skewing when they initially engage the turning belt conveying surface 34. The container guides are useful for this reason, but are not absolutely essential, as has been determined in actual practice by handling containers which are small enough to bypass the guides.

FIG. 7 illustrates a minor problem which requires attention in an orienting apparatus which can handle more than one diameter of container, that being interference between the container and the upper flange 112 defining the upper portion of the groove in the pulley 104. To prevent such interference, the upper flange 112, and its counterpart flange 112a for the pulley 104a, is cut away to clear the largest diameter container so that the container is fully supported by the delivery belts 20. The clearance between the containers and the pulleys will obviously increase when smaller diameter containers are handled.

The delivery belt 20 at the left side of the container inlet path is mounted in similar manner, but to provide drive movement in the proper direction, its lower pulley 102a (FIG. 6) is mounted on a shaft 100a driven by intermeshing gears 118 on the shafts 100 and 100a.

With reference to FIGS. 3 and 4, the input conveyor 12 (the details of which are not an essential part of the present invention) is provided with grooved drive and idler sheaves 120, 122 which move the upper reaches of the belts 16 across a support track 124 for directing the incoming containers between the delivery belts 16. It will be evident that in some cases the input conveyor 12 may either by an integral discharge conveyor of an associated apparatus such as a continuous cooker, may be an independent feed conveyor of another type such as a belt conveyor or feed chute, or can be incorporated into the container orienting apparatus 10 and driven from the shaft 90, or by independent power means. It should also be noted that the turning belt 20 can be oriented in the opposite direction for a right-hand turn, and that its curvilinear form is not restricted to the left angle turn shown.

In regard to the operational principles, it will be apparent that the inclination angle $a$ (FIG. 4) of the turning belt conveyor 20 is related to the mass of a container and the mean velocity of the turning belt 21. As previously noted, however, once the inclination and belt velocity is determined for a given output rate, a large range of different size containers can be handled because the gravitational acceleration is a constant, and the rolling friction and air friction can for all practial purposes be ignored. The inclination angle $a$ can be a relatively shallow angle and still attain a high output. In one embodiment of the invention, the angle $a$ between a horizontal plane and the conveying surface 34 was 17 degrees and the containers weighed 50 ounces. Radial dimensions from the point 62 to the near and far arcuate edges 50 and 52 of the turning belt 28 were 24 inches and 60 inches, and the deceleration of the containers resulted in a reduction of container velocity, from input to output, of 60 per cent. Thus, an incoming container having a velocity of 240 feet per minute will decelerate to 96 feet per minute at the point it enters the discharge chute 24. The orienting mechanism 10 has been operated at rates of over 500 containers per minute with fully satisfactory results.

Before summarizing the operation, it should be noted that a container in the position of the container C9 (FIG. 1), although it has decelerated to about two fifths of its entrance velocity, still has a forward component of movement. In order to rapidly arrest the container so that its endwise motion stops, it has been found useful to employ a cover sheet 130 of polyurethane on the bottom of the discharge chute 24 at the entrance to the chute. The cover sheet has a high coefficient of friction with all types of containers, and prevents any contact of the containers with the outer sidewall of the chute.

The container C1 (FIG. 1) has just been delivered by the delivery conveyor 18 at just above the velocity of the section of the conveying surface 34 which supports the container, in order to space the container from the next adjacent container on the delivery conveyor. Since there is a small velocity differential and elevational difference between a container and the conveying surface at the point of transfer, it is advisable to employ a curved, adjustable and flexible guide 132 so positioned as to positively but gently prevent lateral movement of the entering container and maintain it in a position where its rolling axis 64 is perpendicular to the radial line 66 which is generated from the roller axis intersection 62. The shape of the flexible guide 132 can be adjusted by means of mounting links 134 (FIGS. 1 and 5) extending between the outer channel 72 and brackets 136 on the guide 132. As soon as the container clears the delivery belts 20, gravity begins to influence the trajectory of the container, and it begins to roll toward the point 62 under the acceleration of gravity.

While the deceleration of the containers in the direction of their axes is continuous, their acceleration (rolling) toward the point 62 increases as the containers approach the upwardly inclined terminal roller 32 during their transport along the conveying surface 34. Thus, the endwise interspacing of the containers progressively decreases, but their lateral spacing progressively increases because of the rolling action. This allows the axes of the containers to eventually overlap in a lateral direction, as shown for the containers C7, C8 and C9 in FIG. 1. By the time a container has reached the position of the container C7, its endwise (axial) velocity is nearly half its initial velocity, and thus deceleration continues. At the time the container is discharged from the position of the container C9, it has decelerated axially to less than 40 per cent of its axial entrance velocity.

More important, this axial deceleration is carried out with no contact between containers, and with no more than frictional contact with the conveying surface. Further, the diminished forward axial velocity of the container C9 at the discharge position assures that the remaining axial velocity of the containers can be arrested by the polyurethane chute surface 130 without seal damage, dents or other undesirable results. The discharge chute 24, in the present example, is angled downward at about 15 degrees from horizontal, and axial motion of the containers has virtually stopped upon entering the chute. Because of the small angle of inclination $a$ of the belt 28 at discharge, and because of the small angle of inclination of the chute 24 at its entrance, the rolling movement of the containers down the chute 24 is at such a low velocity, and there is no danger of damage from rolling contact of one container with one another.

Thus, in accordance with the previously enumerated features stated in the summary and described in the specification, 1. The turning belt 28 merely supports and transports the containers, thus minimizing the danger of denting, breakage, or other damage;
2. The apparatus is readily adapted to handle one of a range of different container sizes;
3. The orienting function is carried out with axial deceleration of the containers while maintaining radial separation thereof to further reduce the possibility of container or product damage;
4. The foregoing features cooperatively assure the safe orienting of glass, aluminum, paper or other cylindrical containers that are easily damaged or broken, and which cannot be subjected to magnetic force;
5. The orienting is carried out primarily only supporting contact, at relatively high delivery rates, and with continuous motion.

Although the best mode contemplated for carrying out the present invention has been herein shown and described, it will be apparent that modification and variation may be made without departing from what is regarded to be the subject matter of the invention.

What is claimed is:

1. Apparatus for gently turning a row of cylindrical containers from their initial end to end positions to side to side positions, said apparatus comprising a feed conveyor for supplying a row of containers end to end, an endless container turning conveyor comprising a belt having an upper reach that moves in an arcuate path from a receiving end to a terminal end that is at about 90° to said receiving end, said arcuate path being inclined upwardly from said feed conveyor, said turning conveyor belt having radially inner and outer arcuate edges, said feed conveyor delivering containers to the receiving end of said turning conveyor belt at a zone that is spaced a substantial distance from the radially inner arcuate edge of the turning conveyor belt, a takeaway conveyor leading away from the inner arcuate edge of said turning conveyor belt reach adjacent the terminal end of said turning conveyor, said takeaway conveyor being initially generally parallel to said feed conveyor and receiving containers that have had their axes turned about 90° by said turning conveyor as the containers roll sideways down the turning conveyor belt and into side by side relationship.

2. The orienting apparatus of claim 1, wherein said turning conveyor belt is trained over container receiving and terminal conical rollers, the container rceiving roller being disposed so that the upper belt contacting surface of that roller is substantially horizontal, the terminal roller being disposed so that the upper belt contacting surface of that roller inclines upwardly from the inner to the outer edge of the belt.

3. The orienting apparatus of claim 2, whereby said belt surface inclines upwardly at an angle in the order of 15° – 20° at said container receiving roller.

* * * * *